US011825490B2

(12) United States Patent
Krishnamoorthy et al.

(10) Patent No.: US 11,825,490 B2
(45) Date of Patent: Nov. 21, 2023

(54) POWER AND PERFORMANCE EFFICIENT ALGORITHMS FOR IDLE AND INACTIVE MODE USE EQUIPMENT IN 5G NEW RADIO

(71) Applicant: QUALCOMM Incorporated, San Diego, CA (US)

(72) Inventors: Parthasarathy Krishnamoorthy, San Diego, CA (US); Linhai He, San Diego, CA (US); Kuo-Chun Lee, San Diego, CA (US); Karthik Pavan Krishna Bhogaraju, San Diego, CA (US); Sudheer Kumar Reddy Vangala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/382,830

(22) Filed: Jul. 22, 2021

(65) Prior Publication Data
US 2023/0027232 A1    Jan. 26, 2023

(51) Int. Cl.
*H04W 72/23*    (2023.01)
*H04W 68/00*    (2009.01)

(52) U.S. Cl.
CPC ......... *H04W 72/23* (2023.01); *H04W 68/005* (2013.01)

(58) Field of Classification Search
CPC ... H04W 72/23; H04W 68/005; H04W 76/27; H04W 76/28; H04W 68/02
See application file for complete search history.

(56) References Cited

U.S. PATENT DOCUMENTS

| | | | | |
|---|---|---|---|---|
| 2019/0297577 A1* | 9/2019 | Lin | .................. | H04W 52/0235 |
| 2019/0320455 A1* | 10/2019 | Chen | ..................... | H04L 5/001 |
| 2019/0349902 A1* | 11/2019 | Soriaga | ................. | H04W 72/23 |
| 2020/0163050 A1* | 5/2020 | Lee | ........................ | H04W 48/12 |
| 2020/0169446 A1* | 5/2020 | Chen | ..................... | H04L 5/0053 |
| 2021/0014011 A1* | 1/2021 | Xiong | .................... | H04W 72/53 |
| 2021/0058214 A1* | 2/2021 | Chen | ................... | H04W 68/025 |
| 2021/0058894 A1* | 2/2021 | Wang | .................... | H04W 76/27 |
| 2021/0219263 A1* | 7/2021 | Gao | ........................ | H04W 68/02 |
| 2022/0015146 A1* | 1/2022 | Rune | ..................... | H04B 7/0695 |

OTHER PUBLICATIONS

LG Electronics, "Paging Design in NR," 3GPP TSG RAN WG1 Meeting #92, R1-1802205, Anthens, Greece, Feb. 26-Mar. 2, 2018, 7 Pages (Year: 2018).*
Vivo, "Remaining issues on emBB DCI format," 3GPP TSG RAN WG1 Meeting #93, R1-1806058, Busan, Korea, May 21-25, 2018, 6 pages. (Year: 2018).*
Huawei et al., DCI contents and formats for RMSI/OSI/Paging/RAR, 3GPP TSG RAN WG1 Meeting #92,3GPP Draft; R1-1804426, Apr. 4, 2018 (Year: 2018).*
Huawei, HiSilicon, "UE Power saving for paging," 3GPP TSG RAN WG1 Meeting #95, R1-1812685, Spokane, USA, Nov. 12-16, 2018 4 pages (Year: 2018).*

* cited by examiner

*Primary Examiner* — Ayaz R Sheikh
*Assistant Examiner* — Tarell A Hampton
(74) *Attorney, Agent, or Firm* — The Marbury Law Group

(57) ABSTRACT

Various embodiments may provide systems and methods for supporting wireless device paging in a network, such as a Fifth Generation (5G) New Radio (NR) (5GNR) network, etc. In various embodiments, a wireless device may determine whether to decode a Physical Downlink Shared Channel (PDSCH) paging message based at least in part on an indication in a received downlink control information (DCI) message.

16 Claims, 11 Drawing Sheets

POWER AND PERFORMANCE EFFICIENT ALGORITHMS FOR IDLE AND INACTIVE MODE USE EQUIPMENT IN 5G NEW RADIO

BACKGROUND

Long Term Evolution (LTE), 5G new radio (NR) (5GNR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include systems and methods for supporting wireless device paging in a network, such as a Fifth Generation (5G) New Radio (NR) (5GNR) network, etc.

Various aspects include methods performed by a processor of a wireless device for supporting wireless device paging in a network, which may include decoding a downlink control information (DCI) message received from a base station of the network on a Physical Downlink Control Channel (PDCCH), determining whether the DCI message includes an indication that a Paging Message is intended for the wireless device, and skipping decoding of a Physical Downlink Shared Channel (PDSCH) in a current paging discontinuous reception (DRX) cycle in response to determining that the DCI message does not include the indication that the Paging Message is intended for the wireless device. In some aspects, the network may be a 5GNR network.

Various aspects may further include decoding the PDSCH in the current paging DRX cycle in response to determining that the DCI message includes the indication that the Paging Message is intended for the wireless device. In some aspects, the DCI message may be a DCI format 1_0 message with a cyclic redundancy check (CRC) scrambled by a Paging-Radio Network Temporary Identifier (RNTI) (P-RNTI). In some aspects, the wireless device may be operating in a Radio Resource Control (RRC)_IDLE mode.

In some aspects, determining whether the DCI message includes the indication that the Paging Message is intended for the wireless device may include determining whether a bit value setting in a Short Message field of the DCI format 1_0 message with the CRC scrambled by P-RNTI equals a value associated with a Paging Message being intended only for wireless devices operating in the RRC_INACTIVE mode. Some aspects may further include determining that the DCI messages does not include the indication that the Paging Message is intended for the wireless device in response to determining that the bit value setting in the Short Message field of the DCI format 1_0 message with the CRC scrambled by P-RNTI is equal to the value associated with the Paging Message being intended only for wireless devices operating in the RRC_INACTIVE mode. Some aspects may further include determining that the DCI messages includes the indication that the Paging Message is intended for the wireless device in response to determining that the bit value setting in the Short Message field of the DCI format 1_0 message with the CRC scrambled by P-RNTI is not equal to the value associated with the Paging Message being intended only for wireless devices operating in the RRC_INACTIVE mode.

In some aspects, determining whether the DCI message includes the indication that the Paging Message is intended for the wireless device may include determining a value indicated by a last six reserved bits of the DCI format 1_0 message with the CRC scrambled by P-RNTI. Some aspects may further include determining whether the determined value indicated by the last six reserved bits of the DCI format 1_0 message with the CRC scrambled by P-RNTI corresponds to a range of user equipment (UE) identifiers (UE_IDs) including the UE_ID of the wireless device. Some aspects may further include determining that the DCI messages includes the indication that the Paging Message is intended for the wireless device in response to determining that the determined value indicated by the last six reserved bits of the DCI format 1_0 message with the CRC scrambled by P-RNTI corresponds to the range of user UE_IDs including the UE_ID of the wireless device. Some aspects may further include determining that the DCI messages does not include the indication that the Paging Message is intended for the wireless device in response to determining that the determined value indicated by the last six reserved bits of the DCI format 1_0 message with the CRC scrambled by P-RNTI does not correspond to the range of user UE_IDs including the UE_ID of the wireless device.

Various aspects include methods performed by a processor of a base station for supporting wireless device paging in a network, which may include generating a DCI message including an indication that a Paging Message is intended for a set of wireless devices, and sending the DCI message over a PDCCH. In some aspects, the network may be a 5GNR network.

In some aspects, the DCI message may be a DCI format 1_0 message with a CRC scrambled by a P-RNTI.

In some aspects, the set of wireless devices may be a set of only wireless devices operating in a Radio Resource Control (RRC)_INACTIVE mode, and the indication that the Paging Message is intended for the set of wireless devices is a bit setting in a Short Message field of the DCI format 1_0 message with the CRC scrambled by P-RNTI that indicates a Paging Message is intended only for wireless devices operating in the RRC_INACTIVE mode.

In some aspects, the set of wireless devices may be one or more wireless devices, each of the one or more wireless devices associated with its own respective UE_ID, and the indication that the Paging Message is intended for the set of wireless devices may be a value indicated by a last six reserved bits of the DCI format 1_0 message with the CRC scrambled by P-RNTI that indicates one or more ranges of UE_ID values corresponding to the respective UE_IDs of the one or more wireless devices.

Further aspects may include a wireless device having a processor configured to perform one or more operations of any of the methods summarized above. Further aspects may include processing devices for use in a wireless device configured with processor-executable instructions to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

Further aspects may include a base station having a processor configured to perform one or more operations of any of the methods summarized above. Further aspects may include processing devices for use in a base station configured with processor-executable instructions to perform operations of any of the methods summarized above. Further aspects may include a non-transitory processor-readable storage medium having stored thereon processor-executable instructions configured to cause a processor of a base station to perform operations of any of the methods summarized above. Further aspects include a base station having means for performing functions of any of the methods summarized above. Further aspects include a system on chip for use in a base station and that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
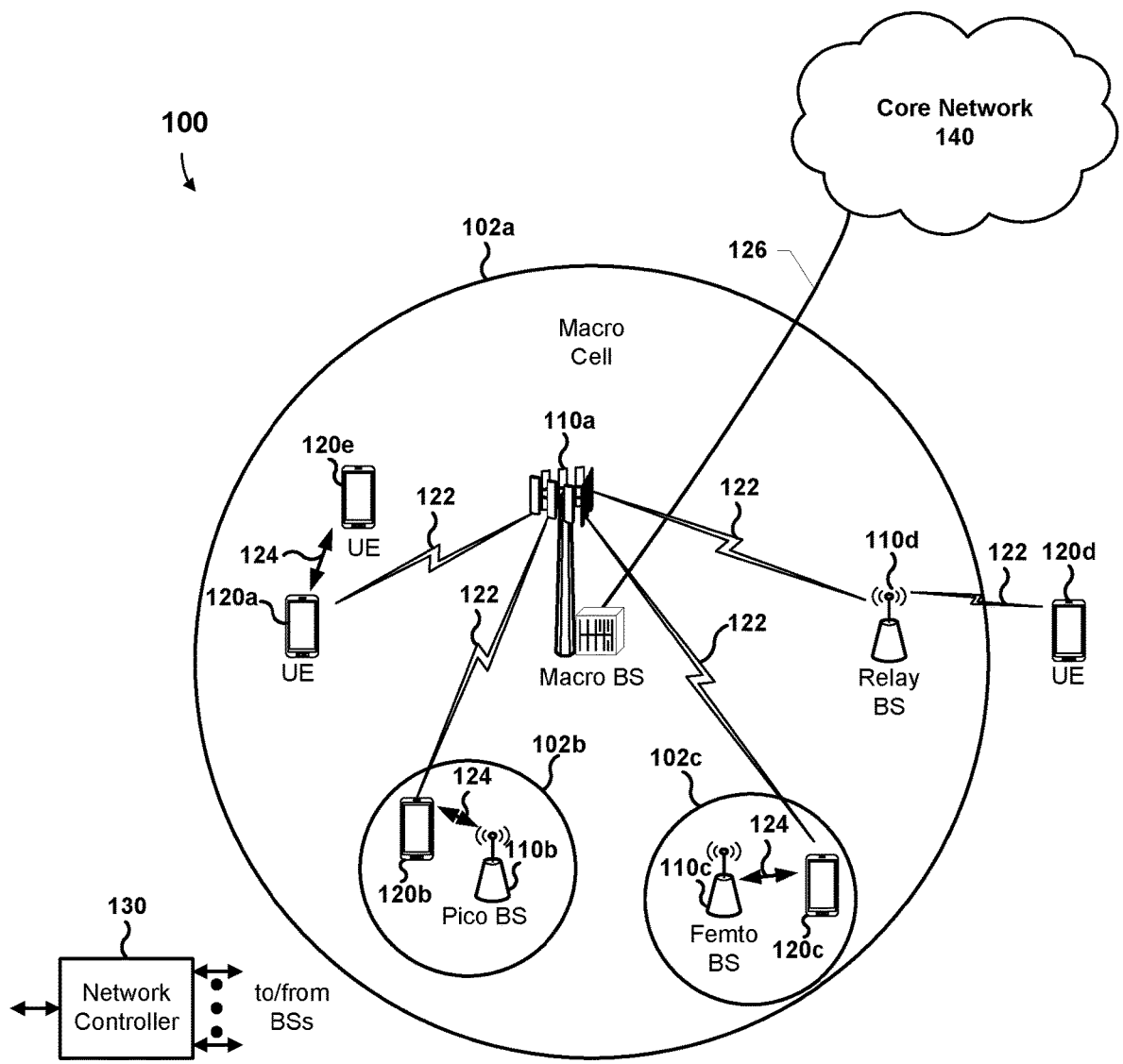
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for supporting wireless device paging in a network, such as a Fifth Generation (5G) New Radio (NR) (5GNR) network, etc. In various embodiments, a wireless device may determine whether to decode a Physical Downlink Shared Channel (PDSCH) based at least in part on an indication in a received downlink control information (DCI) message. In some embodiments, a Short Message field of the DCI message may indicate whether a Paging Message is intended for only Radio Resource Control_INACTIVE (RRC_INACTIVE) mode wireless devices. In some embodiments, a bit value in a field of the DCI message may indicate a set of wireless devices for which a Paging Message may be intended. In various embodiments, a wireless device may decode a PDSCH in response to determining that the Paging Message may be intended for the wireless device and may skip decoding the PDSCH in response to determining that the PDSCH paging message is not intended for the wireless device. Skipping decoding of the PDSCH in scenarios in which a Paging Message is not intended for a wireless device in various embodiments may enable a wireless device to reduce power consumption in comparison to conventional wireless devices which decode the PDSCH each time a Paging Message is signaled on the Physical Downlink Control Channel (PDCCH) because an embodiment wireless device only needs to expend processing capability on PDSCH decoding in those scenarios in which the Paging Message may be intended for the wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

As used herein, the term "RF chain" refers to the components in a communication device that send, receive, and decode radio frequency signals. An RF chain typically includes a number of components coupled together that transmit RF signals that are referred to as a "transmit chain," and a number of components coupled together that receive and process RF signals that are referred to as a "receive chain."

In Fifth Generation (5G) New Radio (NR) (5GNR) systems, new air interface controls for wireless devices are being defined, such as a new Radio Resource Control (RRC) connection state for a wireless device defined as the RRC_INACTIVE state. In a 5GNR system, a wireless device (also referred to as a User Equipment (UE)) may operate in one of three different RRC states at any given time, an RRC_CONNECTED state, an RRC_IDLE state, or an RRC_INACTIVE state. A wireless device is in an RRC_CONNECTED state may be a wireless device operating in an RRC_CONNECTED mode with a RRC connection established and active between the wireless device and a gNB of a 5GNR radio access network (RAN). A wireless device is in an RRC_IDLE state may be a wireless device operating in an RRC_IDLE mode with no RRC connection established between the wireless device and a gNB of a 5GNR RAN. A wireless device operating in an RRC_IDLE mode may monitor paging channels for core network (CN) initiated paging. A wireless device is in an RRC_INACTIVE state may be a wireless device operating in an RRC_INACTIVE mode with a RRC connection established, but suspended, between the wireless device and a gNB of a 5GNR RAN. A wireless device operating in an RRC_INACTIVE mode may monitor paging channels for CN initiated paging and RAN initiated paging.

In a 5GNR system, a wireless device in an RRC_IDLE state may be reached via Paging Messages and notified of system information changes and Earthquake and Tsunami Warning System (ETWS)/Commercial Mobile Alert System (CMAS) indications via Short Messages. Both Paging Messages and Short Messages in a 5GNR system may be address with a Paging-Radio Network Temporary Identifier (RNTI) (P-RNTI) on the Physical Downlink Control Channel (PDCCH). Paging Messages are sent on the Paging Control Channel (PCCH), requiring the wireless device to receive the PDCCH and decode the Physical Downlink Shared Channel (PDSCH) to receive the PCCH. Short Messages are sent on the PDCCH itself, thereby avoiding the need for a wireless device to decode the PDSCH to receive a Short Message. The need to decode the PDSCH to receive Paging Messages may result in a wireless device using a larger amount of power to receive Paging Messages relative to that used to receive Short Messages as in the reception of Short Messages processing capabilities of the wireless device need not be expended to decode the PDSCH.

To reduce the expenditure of processing effort by a wireless device, and thereby the power consumption of the wireless device, a wireless device in a 5GNR system need not monitor paging channels continuously. A paging discontinuous reception (DRX) cycle for a wireless device in an RRC_INACTIVE mode or RRC_IDLE mode may configured for a wireless device in a 5GNR system such that the wireless device may be required to only monitor paging channels during one Paging Occasion (PO) per DRX cycle. A DRX cycle may be scheduled by a base station of the 5GNR system. The paging cycle for RRC_INACTIVE mode wireless devices and the paging cycle for RRC_IDLE mode wireless devices may be the same or different. In a 5GNR system, the paging downlink control information (DCI) for both RRC_INACTIVE mode wireless devices and RRC_IDLE mode wireless devices may be scrambled with the same P-RNTI. Specifically, a DCI format 1_0 message may have a cyclic redundancy check (CRC) scrambled by P-PRNTI. The DCI format 1_0 message with the CRC scrambled by P-RNTI may be used to schedule Paging Messages and may include a Short Message Indicator field of two bits, a Short Message field of eight bits, a Frequency domain resource assignment field of variable length, a Time domain resource assignment field of four bits, a Virtual Resource Block (VRB)-to-Physical Resource Block (PRB) (VRB-to-PRB) mapping field of one bit, a Modulation and coding scheme field of 5 bits, and a Transport Block (TB) Scaling field of two bits. Additionally, at least six bits of the DCI format 1_0 message with the CRC scrambled by P-RNTI may be reserved.

In current 5GNR systems, wireless devices in RRC_INACTIVE mode and RRC_IDLE mode decode the PDSCH in order to determine whether paging is for a wireless device in an RRC_INACTIVE mode or a wireless device in an RRC_IDLE mode. Wireless devices in current 5GNR systems monitor the paging channel for CN paging using the wireless device's 5G S-Temporary Mobile Subscriber Identity (5G-S-TMSI) and RAN paging using the wireless device's full Inactive-RNTI (I-RNTI) which identifies the suspended UE context of a wireless device in an RRC_INACTIVE state. As a RRC_INACTIVE mode or RRC_IDLE mode wireless device in current 5GNR systems must decode the PDSCH in order to determine whether any page is actually intended for that wireless device based on that wireless device's 5G-S-TMSI and/or I-RNTI being indicated, a RRC_INACTIVE mode or RRC_IDLE mode wireless device in current 5GNR systems may expend unnecessary processing efforts, and thereby expend unnecessary amounts of power, waking up to decode a PDSCH to receive the PCCH in scenarios where the Paging Message is not intended for that specific wireless device.

Various embodiments may support wireless device paging in a network, such as a 5GNR network, etc., by enabling a DCI message to signal whether or not a wireless device should attempt to decode a PDSCH to receive a paging message during a DRX cycle. Various embodiments may support wireless device paging in a network, such as a 5GNR network, etc., by enabling a DCI message to signal a paging message is intended for a wireless device. In various embodiments, a wireless device may determine whether to decode a PDSCH to receive a Paging Message based at least in part on an indication in a received DCI message. In various embodiments, a wireless device may remain in a wake state and decode a PDSCH to receive a Paging Message during a DRX cycle in response to determining that the Paging Message may be intended for the wireless device. In various embodiments, a wireless device may skip decoding a PDSCH during a DRX cycle and return to a sleep state in response to determining that the Paging Message is not intended for the wireless device. Skipping decoding of a PDSCH in scenarios in which Paging Messages are not intended for a wireless device in various embodiments may enable a wireless device to reduce power consumption in comparison to conventional wireless devices which decode the PDSCH each time a Paging Message is signaled on the PDCCH because an embodiment wireless device only needs to expend processing capability on PDSCH decoding in response to determining that the Paging Message may be intended for the wireless device.

In various embodiments, a base station of a network, such as a 5GNR RAN (e.g., a gNB), etc., may generate a DCI message including an indication that a Paging Message is intended for a set of wireless devices. The base station may transmit the DCI message. In various embodiments, a wireless device may receive and decode the DCI message. The wireless device may determine whether the Paging Message is intended for the wireless device based on the indication in the DCI message. In response to determining that the Paging Message is intended for the wireless device, the wireless device may decode the PDSCH. In response to determining that the Paging Message is not intended for the wireless device, the wireless device may skip decoding the PDSCH.

In some embodiments, a Short Message field of a DCI message, such as a DCI format 1_0 message with the CRC scrambled by P-RNTI, other DCI format message providing paging scheduling, etc., may indicate whether a Paging Message is intended for only RRC_INACTIVE mode wireless devices. In various embodiments, a bit of a Short Message field of a DCI message, such as the fourth bit, fifth bit, sixth bit, seventh bit, eighth bit, etc., may indicate whether a Paging Message is intended for only RRC_INACTIVE mode wireless devices. As one example, the eighth bit being set to "1" (or alternative to "0") may indicate the Paging Message is intended for only RRC_INACTIVE mode wireless devices. As a similar example, the eighth bit being set to "1" (or alternatively "0") may indicate the Paging Message is strictly only for wireless devices not in an RRC_IDLE mode. As another example, the eighth bit being set to "0" (or alternatively "1") may indicate the Paging Message may be intended for wireless devices in RRC_IDLE mode or RRC_INACTIVE mode.

In various embodiments, a base station of a network, such as a 5GNR RAN (e.g., a gNB), etc., may determine whether a Paging Message is intended for only RRC_INACTIVE mode wireless devices. In response to determining that the Paging Message is intended only for RRC_INACTIVE mode wireless devices (e.g., intended for one or more RRC_INACTIVE mode wireless devices and no RRC_IDLE mode wireless devices) the base station may set a bit of a Short Message field of a DCI message, such as the fourth bit, fifth bit, sixth bit, seventh bit, eighth bit, etc., to a value indicating the Paging Message is intended for only RRC_INACTIVE mode wireless devices (e.g., "0" or "1"). In response to determining that the Paging Message is not intended only for RRC_INACTIVE mode wireless devices (e.g., intended for at least one RRC_IDLE mode wireless device) the base station may set a bit of a Short Message field of a DCI message, such as the fourth bit, fifth bit, sixth bit, seventh bit, eighth bit, etc., to a value indicating the Paging Message is not intended for only RRC_INACTIVE mode wireless devices (e.g., "0" or "1"). The bit value indicating the Paging Message is not intended for only RRC_INACTIVE mode wireless devices may be different from the bit value indicating the Paging Message is intended for only RRC_INACTIVE mode wireless devices.

In various embodiments, a wireless device in an RRC_IDLE mode may receive a DCI message, such as a DCI format 1_0 message with the CRC scrambled by P-RNTI, other DCI format message providing paging scheduling, etc., from a base station of a network, such as a 5GNR RAN (e.g., a gNB), etc. The RRC_IDLE mode wireless device may determine a bit value setting (e.g., "0" or "1") of a bit of a Short Message field of the DCI message, such as the fourth bit, fifth bit, sixth bit, seventh bit, eighth bit, etc. The RRC_IDLE mode wireless device may determine whether the determined bit value setting equals a value associated with the Paging Message being intended only for RRC_INACTIVE mode wireless devices (e.g., intended strictly not for RRC_IDLE mode wireless devices). In response to determining that the Paging Message is intended for the wireless device, the wireless device may decode the PDSCH. In response to determining that the determined bit value setting equals a value associated with the Paging Message being intended only for RRC_INACTIVE mode wireless devices, the RRC_IDLE mode wireless device may skip decoding the PDSCH. In response to determining that the determined bit value setting does not equal a value associated with the Paging Message being intended only for RRC_INACTIVE mode wireless devices, the RRC_IDLE mode wireless device may decode the PDSCH.

In some embodiments, a bit value in a field of a DCI message, such as a DCI format 1_0 message with the CRC scrambled by P-RNTI, other DCI format message providing paging scheduling, etc., may indicate a set of wireless devices for which a Paging Message may be intended. In various embodiments, bits of a DCI message, such as a DCI format 1_0 message with the CRC scrambled by P-RNTI, other DCI format message providing paging scheduling, etc., may be used to indicate a set (or grouping) of wireless devices for which a Paging Message may be intended. For example, a value of a reserved six bits of a DCI format 1_0 message with the CRC scrambled by P-RNTI may be set such that the least significant bit (LSB) of the six reserved bits indicates a set (or grouping) of UE identifiers (UE_IDs) assigned to wireless devices. Each wireless device's UE_ID may be based on the wireless device's 5G-S-TMSI, for example, the wireless device's UE_ID may be defined as the wireless device's 5G-S-TMSI mod 1024 resulting in possible UE_ID values of 0 to 1023. Ranges of UE_ID values may be associated with LSB bit determinations for the six reserved bits in the DCI format 1_0 message with the CRC scrambled by P-RNTI. For example, LSB bit 1 (000001) may be associated with UE_ID values 0 to 169, LSB bit 2 (000010) may be associated with UE_ID values 170 to 339, LSB bit 3 (0000100) may be associated with UE_ID values 340 to 509, LSB bit 4 (001000) may be associated with UE_ID values 510 to 679, LSB bit 5 (010000) may be associated with UE_ID values 680 to 849, and LSB bit 6 (100000) may be associated with UE_ID values 850 to 1023. Additionally, the six reserved bits in the DCI format 1_0 message with the CRC scrambled by P-RNTI may be set all to zero, or the six reserved bits may not be transferred, to indicate the network is not intending to indicate the set of wireless devices for which the Paging Message is intended.

In some embodiments, based on the UE_IDs of the wireless devices the Paging Message is intended for, a base station of a network, such as a 5GNR RAN (e.g., a gNB), etc., may set the values of the reserved six bits of a DCI format 1_0 message with the CRC scrambled by P-RNTI such that the LSBs of the six reserved bits indicate the UE_IDs of the wireless devices for which the Paging Message is intended. For example, the base station may determine a Paging Message is intended for wireless devices with the UE_IDs 180 and 640. The base station may set the values of the reserved six bits of a DCI format 1_0 message with the CRC scrambled by P-RNTI to the value "001010" as the first UE_ID of 180 falls in the range of UE_ID values 170 to 339 associated with LSB bit 2 (000010) and the second UE_ID of 640 falls in the range of UE_ID values 510 to 679 associated with LSB bit 4 (001000).

In various embodiments, a wireless device may receive a DCI format 1_0 message with the CRC scrambled by P-RNTI from a base station of a network, such as a 5GNR RAN (e.g., a gNB), etc., decode the DCI format 1_0 message with the CRC scrambled by P-RNTI, and determine whether the LSBs of the six reserved bits that the wireless device is in a set of wireless devices for which a Paging Message may be intended. As an example, the wireless device may have stored thereon a mapping between LSB bit values and UE_IDs, such as in a look-up table, hardcoded setting, etc. The wireless device may compare the value of the LSBs of the six reserved bits in the decoded DCI format 1_0 message with the CRC scrambled by P-RNTI to the mapping between LSB bit values and UE_IDs to determine the UE_ID ranges to which the Paging Message is intended. The wireless device may determine whether its UE_ID falls in any of the UE_ID ranges to which the Paging Message is intended. In response to determining that the UE_ID of the wireless device falls in the UE_ID ranges to which the Paging Message is intended, the wireless device may decode the PDSCH. In response to determining that the UE_ID of the wireless device does not fall in the UE_ID ranges to which the Paging Message is intended, the wireless device may skip decoding of the PDSCH.

FIG. 1 illustrates an example of a communications system 100 that is suitable for implementing various embodiments. The communications system 100 may be a 5G New Radio (NR) (5GNR) network, or any other suitable network such as a Long Term Evolution (LTE) network. While FIG. 1 illustrates a 5GNR network, later generation networks may include the same or similar elements. Therefore, the reference to a 5GNR network and 5GNR network elements in the following descriptions is for illustrative purposes and is not intended to be limiting.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted Access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110*a*-110*d* may communicate with the core network 140 over a wired or wireless communication link 126. The wireless device 120*a*-120*e* (UE computing device) may communicate with the base station 110*a*-110*d* over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110*d*). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and Control for these base stations. The network controller 130 may communicate with the base stations via a backhaul. The base stations also may communicate with one another, for example, directly or indirectly via a wireless or wireline backhaul.

The wireless devices (UE computing devices) 120*a*, 120*b*, 120*c* may be dispersed throughout communications system 100, and each wireless device may be stationary or mobile. A wireless device also may be referred to as an Access terminal, a UE, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio Access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL Control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio Access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a-110d.

Figure 2:
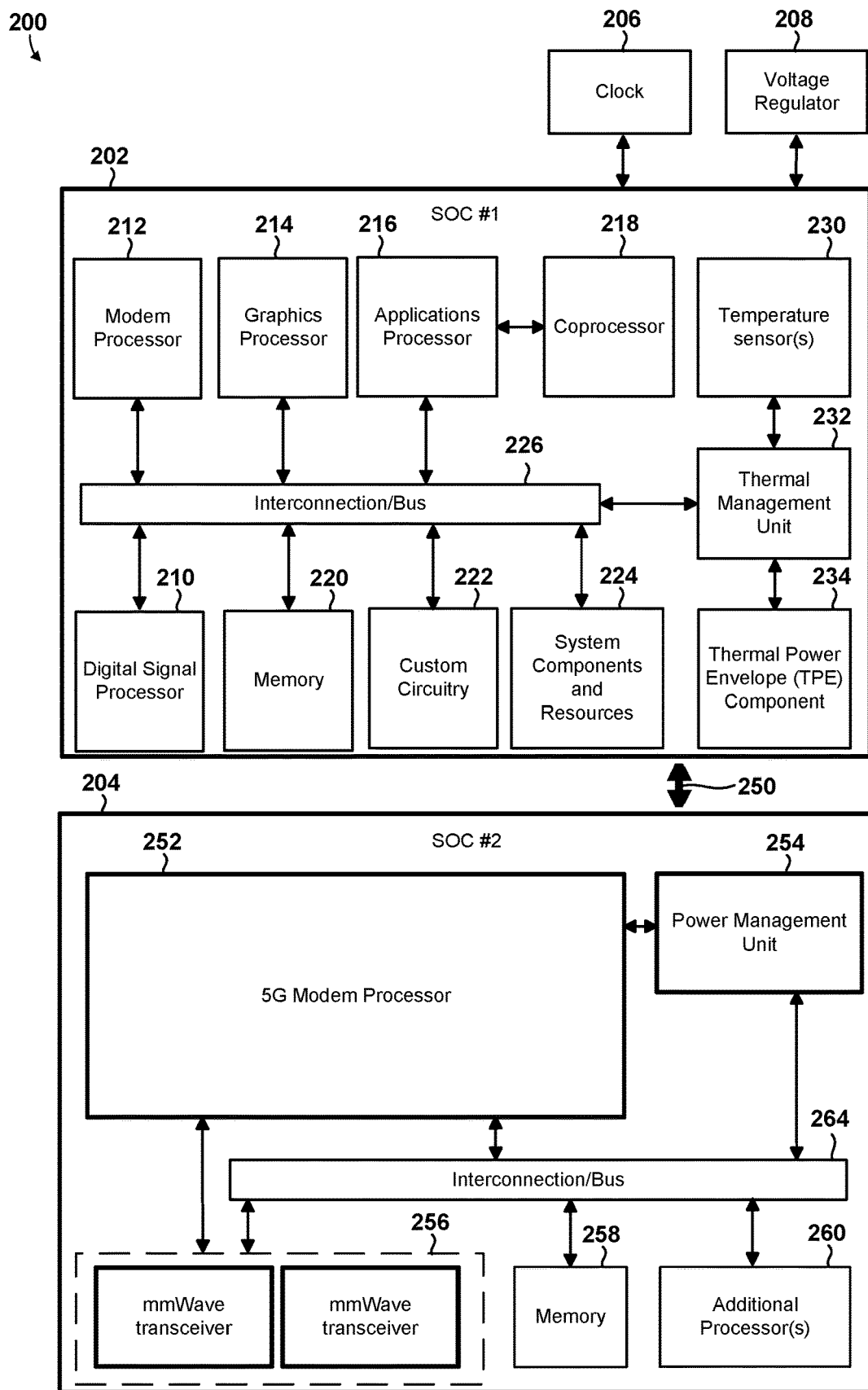
FIG. 2 is a component block diagram illustrating an example computing system and wireless modem suitable for implementing various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the wireless device that carries out the instructions of software application programs by performing the arithmetic, logical, Control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal Management unit 232, and a thermal power envelope (TPE) component 234. The second SOC 204 may include a 5G modem processor 252, a power Management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, Access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal Management unit 232 via an interconnection/bus module 226. Similarly, the processor 252 may be interconnected to the power Management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
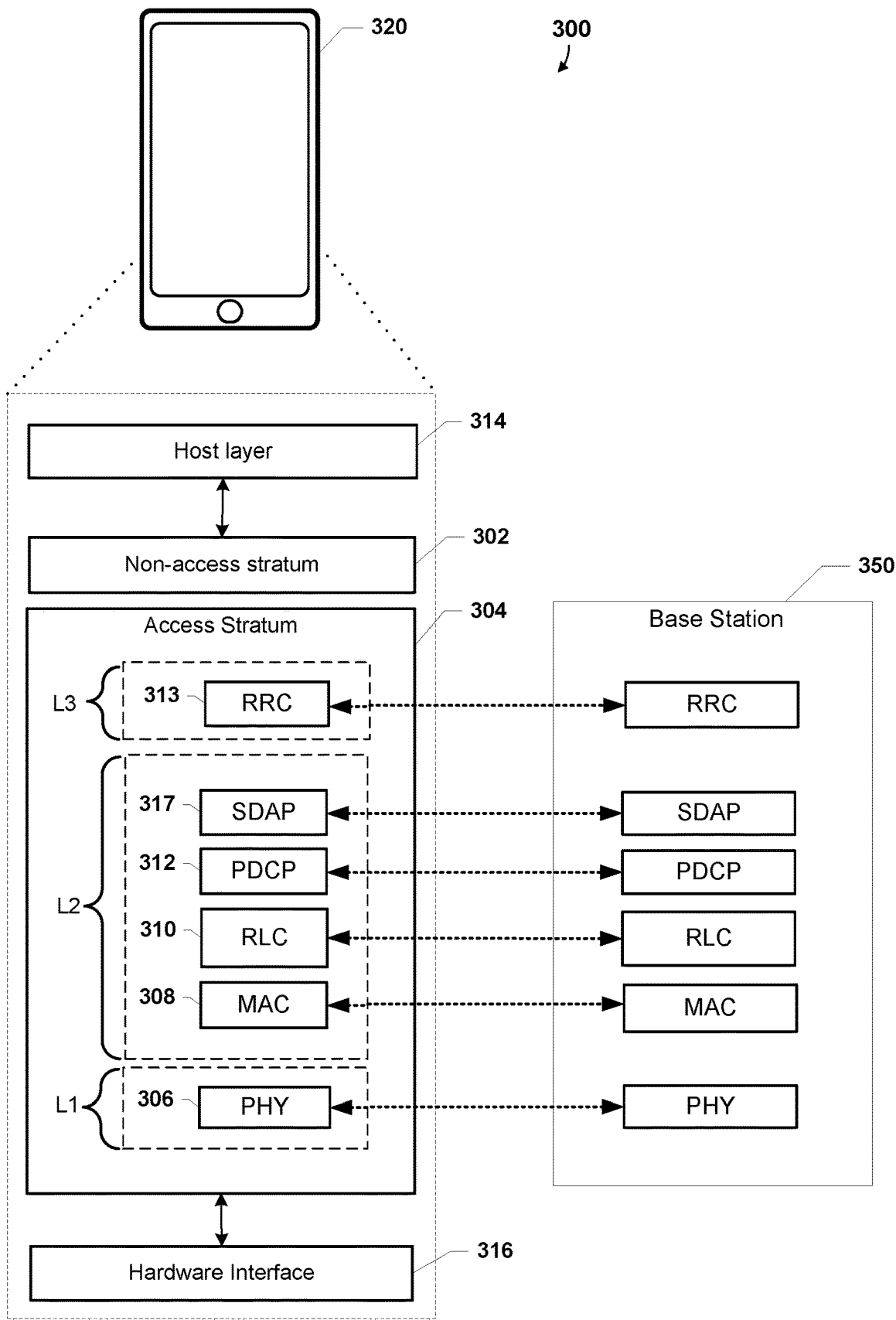
FIG. 3 is a component block diagram illustrating a software architecture including a radio protocol stack for the user and control planes in wireless communications suitable for implementing various embodiments.

FIG. 3 is a component block diagram illustrating a software architecture 300 including a radio protocol stack, also referred to as a wireless protocol stack, for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack (or one wireless protocol stack), in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support Channel State Information (CSI) measurements and reporting (e.g., Channel Quality Indicator (CQI) measurements and reporting).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio Link Control (RLC) sublayer 310, a Packet Data Convergence Protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
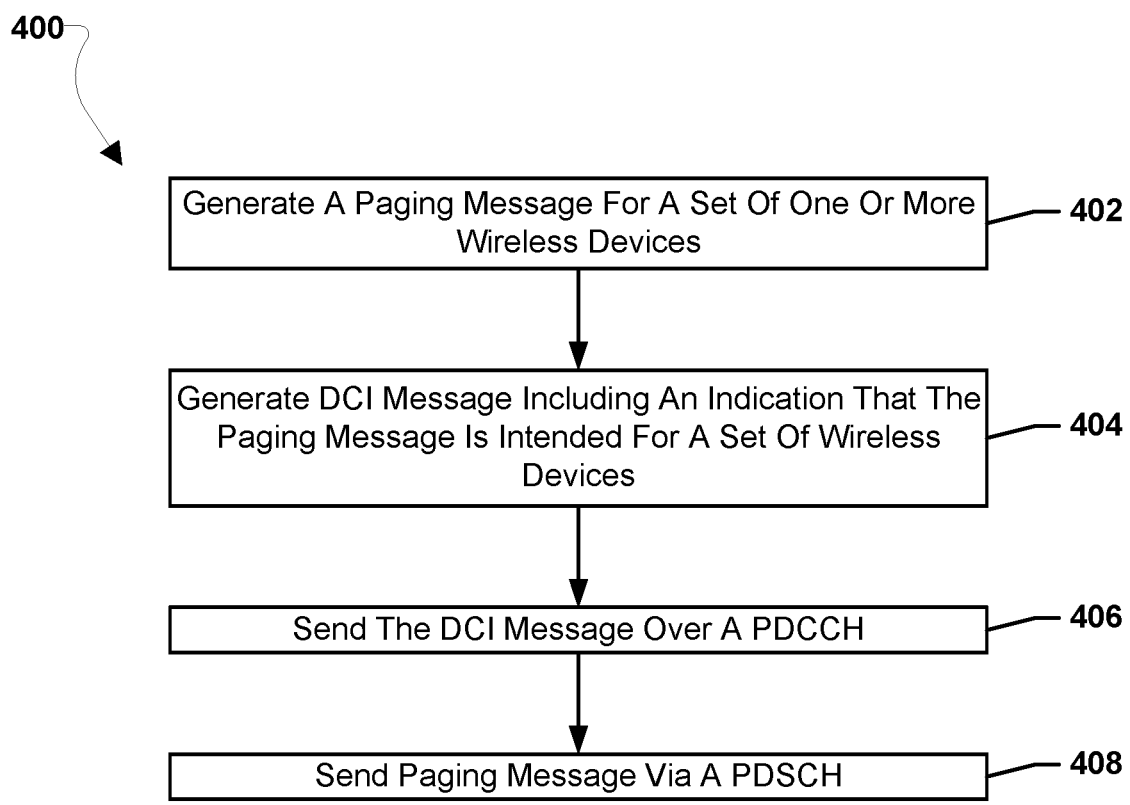
FIG. 4 is a process flow diagram illustrating a method performed by a processor of a base station for supporting wireless device paging in a network, such as a Fifth Generation (5G) New Radio (NR) (5GNR) network, etc., in accordance with various embodiments.
Figure 5:
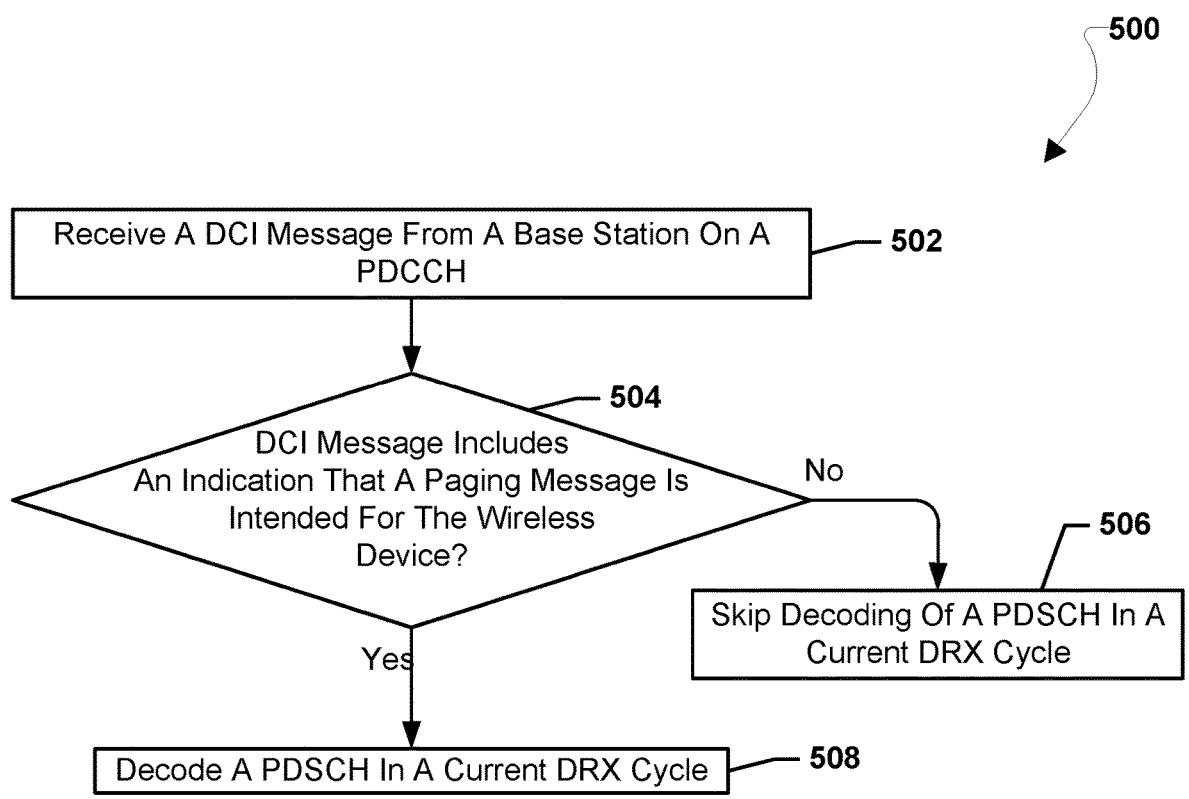
FIG. 5 is a process flow diagram illustrating a method performed by a processor of a wireless device for supporting wireless device paging in a network, such as a 5GNR network, etc., in accordance with various embodiments.

FIG. 5 shows a process flow diagram of an example method for providing streaming service assistance in a 5GS network according to various embodiments. With reference to FIGS. 1-5, the method 500 may be implemented by a processor a base station (e.g., the base station 110a-110d, 350) and/or a wireless device (e.g., the wireless device 120a-120e, 200, 320).

FIG. 4 is a process flow diagram illustrating an example method 400 for supporting wireless device paging in a network, such as a 5GNR network, etc., according to various embodiments. With reference to FIGS. 1-4, the method 400 may be performed by a processor of a base station (e.g., the base station 110a-110d, 350), one specific example of which may be a gNB of a 5GNR RAN. In some scenarios, the operations of method 400 may be performed by the base station on a per DRX cycle basis.

In block 402, the processor of the base station may generate a Paging Message for a set of one or more wireless devices. For example, the Paging Message may be a Paging Message for a single wireless device, two or more wireless devices, all wireless devices, etc. The Paging Message may be for only RRC_INACTIVE mode wireless devices, only for RRC_ACTIVE mode wireless devices, for a mixture of RRC_ACTIVE mode wireless devices and RRC_INACTIVE mode wireless devices, etc.

In block 404, the processor of the base station may generate a DCI message including an indication that the Paging Message is intended for a set of wireless devices. The DCI message may be a DCI format 1_0 message with the CRC scrambled by P-RNTI, another DCI format message providing paging scheduling, etc. In some embodiments, a Short Message field of the DCI message may indicate whether a Paging Message is intended for only Radio Resource Control_INACTIVE (RRC_INACTIVE) mode wireless devices. In some embodiments, a bit value in a field of the DCI message may indicate a set of wireless devices for which a Paging Message may be intended.

In block 406, the processor of the base station may send the DCI message over a PDCCH.

In block 408, the processor of the base station may send the Paging Message via a PDSCH.

FIG. 5 is a process flow diagram illustrating an example method 500 for supporting wireless device paging in a network, such as a 5GNR network, etc., according to various embodiments. With reference to FIGS. 1-5, the method 500 may be performed by a processor of a wireless device (e.g., the wireless device 120a-120e, 200, 320). As a specific example, the operations of method 500 may be performed by a wireless device operating in a DRX cycle as scheduled by a base station (e.g., the base station 110a-110d, 350), such as a gNB of a 5GNR RAN. In various embodiments, the operations of method 500 may be performed in conjunction with the operations of method 400 (FIG. 4). In some scenarios, the operations of method 500 may be performed by the wireless device on a per DRX cycle basis.

In block 502, the processor of the wireless device may receive a DCI message from a base station on a PDCCH. The DCI message may be a DCI format 1_0 message with the CRC scrambled by P-RNTI, another DCI format message providing paging scheduling, etc.

In determination block 504, the processor of the wireless device may determine whether the DCI message includes an indication that a Paging Message is intended for the wireless device. In some embodiments, a Short Message field of the DCI message may indicate whether a Paging Message is intended for only Radio Resource Control_INACTIVE (RRC_INACTIVE) mode wireless devices. In some embodiments, a bit value in a field of the DCI message may indicate a set of wireless devices for which a Paging Message may be intended.

In response to determining that the DCI message does not include an indication that a paging message is intended for the wireless device (i.e., determination block 504="No"), the processor of the wireless device may skip decoding of a PDSCH in a current DRX cycle in block 506. Skipping decoding of a PDSCH in scenarios in which Paging Messages are not intended for a wireless device in various embodiments may enable a wireless device to reduce power consumption in comparison to conventional wireless devices which decode the PDSCH each time a Paging Message is signaled on the PDCCH. Skipping decoding of a PDSCH in scenarios in which Paging Messages are not intended for a wireless device in various embodiments may enable a wireless device the Paging Messages are not intended for to return to a sleep state during the DRX cycle without expending processing resources decoding of a PDSCH.

In response to determining that the DCI message includes an indication that a paging message is intended for the wireless device (i.e., determination block 504="Yes"), the processor of the wireless device may decode a PDSCH in a current DRX cycle in block 508.

Figure 6:
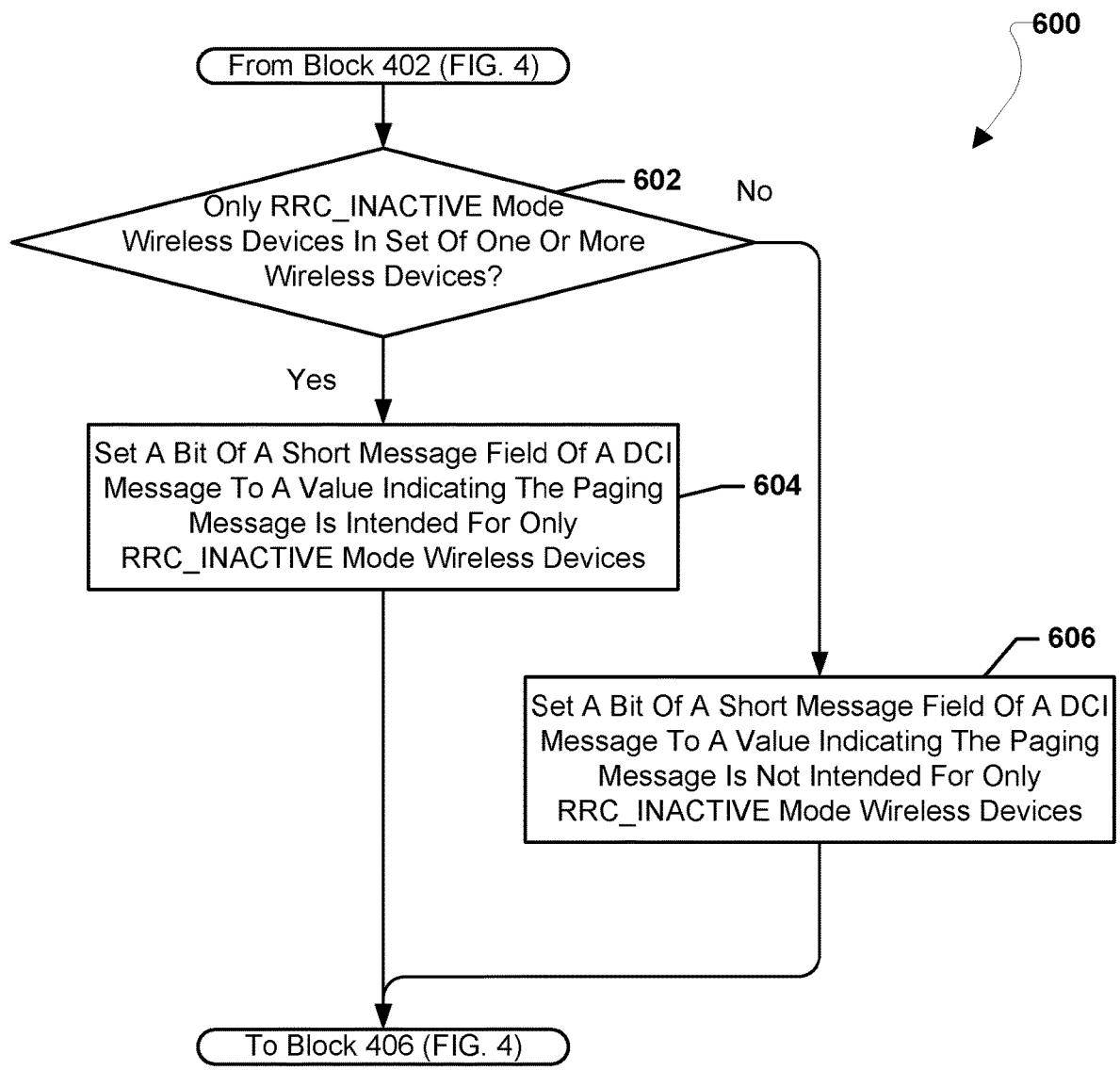
FIG. 6 is a process flow diagram illustrating a method performed by a processor of a base station for generating a DCI message in accordance with various embodiments.

FIG. 6 is a process flow diagram illustrating an example method 600 for generating a DCI message according to various embodiments. With reference to FIGS. 1-6, the method 600 may be performed by a processor of a base station (e.g., the base station 110a-110d, 350), one specific example of which may be a gNB of a 5GNR RAN. In various embodiments, the operations of method 600 may be performed in conjunction with the operations of methods 400 (FIG. 4) and/or 500 (FIG. 5). As one specific example, the operations of method 600 may be performed as part of the operations of block 404 of method 400 (FIG. 4) to generate a DCI message that may be a DCI format 1_0 message with the CRC scrambled by P-RNTI.

In response to generating a Paging Message as described with reference to block 402 of method 400 (FIG. 4), in determination block 602 the processor of the base station may determine whether only RRC_INACTIVE mode wireless devices are in the set of one or more wireless devices. For example, the processor of the base station may determine an RRC mode state recorded for each wireless device to which the Paging Message is addressed to determine whether any RRC modes are other than RRC_INACTIVE. Any RRC modes being other than RRC_INACTIVE may indicate the Paging Message is not only for RRC_INACTIVE mode wireless devices. All RRC modes being RRC_INACTIVE may indicate the Paging Message is for only RRC_INACTIVE mode wireless devices.

In response to determining that only RRC_INACTIVE mode wireless devices are in the set of one or more wireless devices (i.e., determination block 604="Yes"), the processor of the base station may set a bit of a Short Message field of a DCI message to a value indicating the Paging Message is intended for only RRC_INACTIVE mode wireless devices in block 604. For example, the base station processor may set a bit of a Short Message field of a DCI message, such as the fourth bit, fifth bit, sixth bit, seventh bit, eighth bit, etc., to a value indicating the Paging Message is intended for only RRC_INACTIVE mode wireless devices (e.g., "0" or "1"). As a specific example, the eighth bit may be set to a value of "1" to indicate the Paging Message is intended for only RRC_INACTIVE mode wireless devices.

In response to determining that other than RRC_INACTIVE mode wireless devices are in the set of one or more wireless devices (i.e., determination block 604="No"), the processor of the base station may set a bit of a Short Message field of a DCI message to a value indicating the Paging Message is not intended for only RRC_INACTIVE mode wireless devices in block 606. For example, the base station processor may set a bit of a Short Message field of a DCI message, such as the fourth bit, fifth bit, sixth bit, seventh bit, eighth bit, etc., to a value indicating the Paging Message is not intended for only RRC_INACTIVE mode wireless devices (e.g., "0" or "1"). As a specific example, the eighth bit may be set to "0" to indicate the Paging Message is not intended for only RRC_INACTIVE mode wireless devices. The bit value indicating the Paging Message is not intended for only RRC_INACTIVE mode wireless devices may be different from the bit value indicating the Paging Message is intended for only RRC_INACTIVE mode wireless devices.

In response to setting the bit of the DCI message in block 604 or 606, the processor of the base station may proceed to block 406 of method 400 (FIG. 4) to send the DCI message over a PDCCH.

Figure 7:
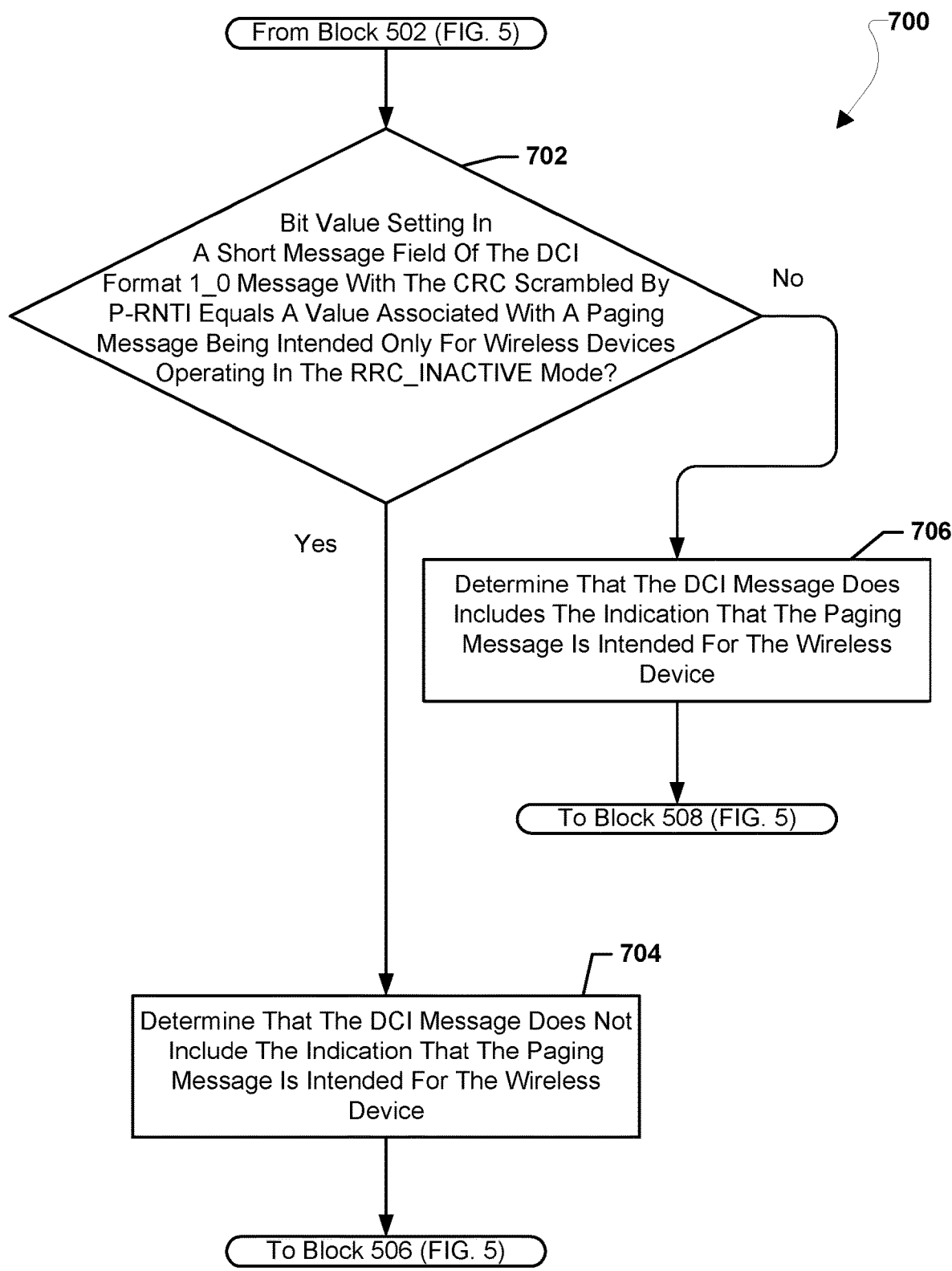
FIG. 7 is a process flow diagram illustrating a method performed by a processor of a wireless device for determining whether a DCI message including an indication that a Paging Message is intended for the wireless device in accordance with various embodiments.

FIG. 7 is a process flow diagram illustrating an example method 700 for determining whether a DCI message including an indication that a Paging Message is intended for the wireless device according to various embodiments. With reference to FIGS. 1-7, the method 700 may be performed by a processor of a wireless device (e.g., the wireless device 120a-120e, 200, 320). As a specific example, the operations of method 700 may be performed by a wireless device operating in a DRX cycle as scheduled by a base station (e.g., the base station 110a-110d, 350), such as a gNB of a 5GNR RAN. In various embodiments, the operations of method 700 may be performed in conjunction with the operations of methods 400 (FIG. 4), 500 (FIG. 5), and/or 600 (FIG. 6). As specific examples, the operations of method 700 may be performed as part of the operations of determination block 504 of method 500 (FIG. 5) to determine whether a DCI message including an indication that a Paging Message is intended for the wireless device and the DCI message that may be a DCI format 1_0 message with the CRC scrambled by P-RNTI. In various embodiments, the operations of method 700 may be performed in scenarios in which the wireless device is operating in an RRC_IDLE mode.

In response to receiving a DCI message as described with reference to block 502 of method 500 (FIG. 5), in determination block 702 the processor of the wireless device may determine whether a bit value setting in a Short Message field of the DCI format 1_0 message with the CRC scrambled by P-RNTI equals a value associated with a Paging Message being intended only for wireless devices operating in the RRC_INACTIVE mode. For example, a value (e.g., "0" or "1") of a bit of a Short Message field of a DCI message, such as the fourth bit, fifth bit, sixth bit, seventh bit, eighth bit, etc., may indicate the Paging Message is intended for only RRC_INACTIVE mode wireless devices. As a specific example, the eighth bit may be set to a value of "1" may indicate the Paging Message is intended for only RRC_INACTIVE mode wireless devices. The processor of the wireless device may parse the Short Message field of the DCI message to determine the bit value setting of a selected position bit, such as the fourth bit, fifth bit, sixth bit, seventh bit, eighth bit, etc., and determine whether the bit value at that position is associated with a Paging Message being intended only for wireless devices operating in the RRC_INACTIVE mode. For example, the processor may subtract the bit value at the selected position bit from a bit value setting in a memory associated with a Paging Message being intended only for wireless devices operating in the RRC_INACTIVE mode. A zero result may indicate the bit value setting in a Short Message field of the DCI format 1_0 message with the CRC scrambled by P-RNTI equals a value associated with a Paging Message being intended only for wireless devices operating in the RRC_INACTIVE mode. A non-zero result may indicate the bit value setting in a Short Message field of the DCI format 1_0 message with the CRC scrambled by P-RNTI does not equal a value associated with a Paging Message being intended only for wireless devices operating in the RRC_I-NACTIVE mode In response to determining that the bit value setting in the Short Message field of the DCI format 1_0 message with the CRC scrambled by P-RNTI is equal to the value associated with the Paging Message being intended only for wireless devices operating in the RRC_INACTIVE mode (i.e., determination block 702="Yes"), the processor of the wireless device may determine that the DCI messages does not include the indication that the Paging Message is intended for the wireless device in block 704. For example, as the wireless device may be in an RRC_IDLE mode, the paging message that is only for RRC_INACTIVE mode wireless devices may not be for the RRC_IDLE mode device.

In response to determining that the DCI messages does not include the indication that the Paging Message is intended for the wireless device, the processor of the base station may proceed to block 506 of method 500 (FIG. 5) and skip the decoding of the PDSCH.

In response to determining that the bit value setting in the Short Message field of the DCI format 1_0 message with the CRC scrambled by P-RNTI is not equal to the value associated with the Paging Message being intended only for wireless devices operating in the RRC_INACTIVE mode (i.e., determination block 702="No"), the processor of the wireless device may determine that the DCI messages does include the indication that the Paging Message is intended for the wireless device in block 706.

In response to determining that the DCI messages does include the indication that the Paging Message is intended for the wireless device, the processor of the base station may proceed to block 508 of method 500 (FIG. 5) and decode the PDSCH.

Figure 8:
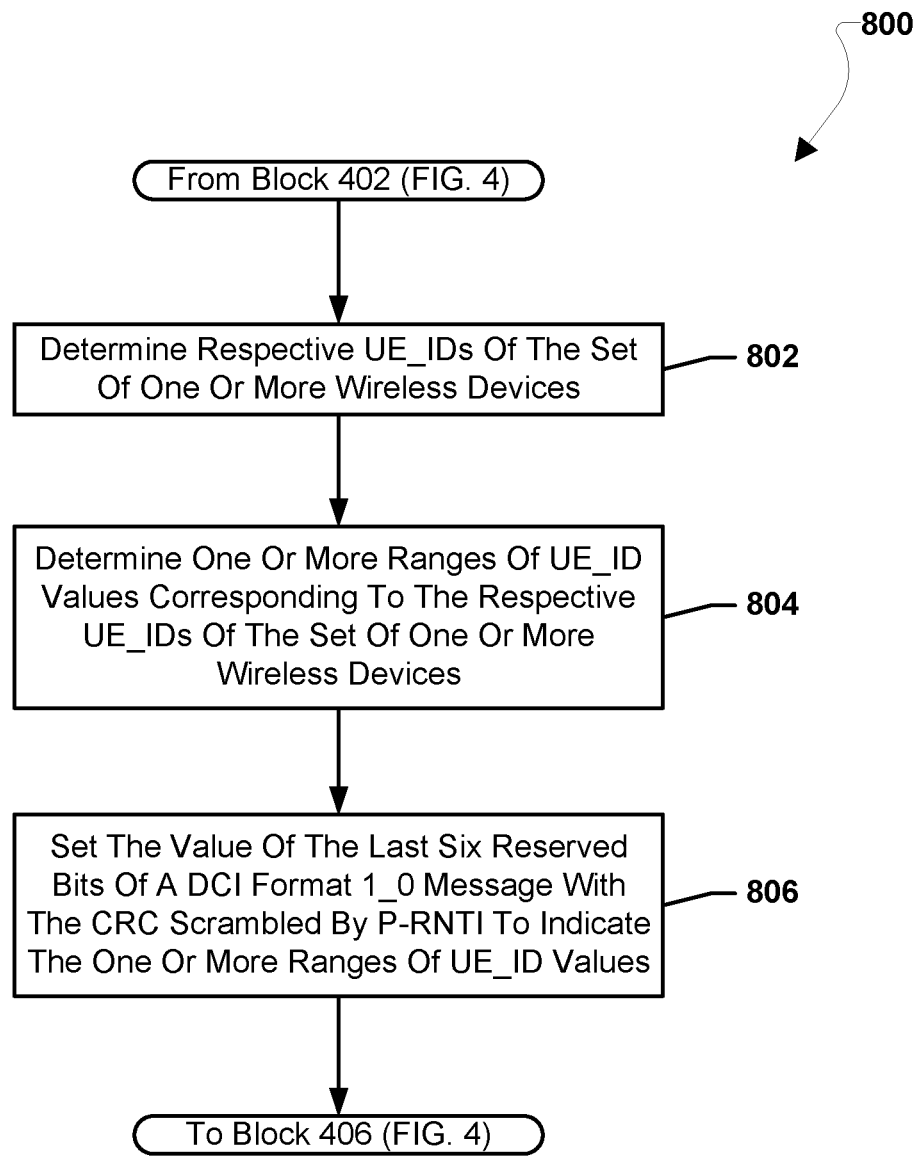
FIG. 8 is a process flow diagram illustrating a method performed by a processor of a base station for generating a DCI message in accordance with various embodiments.

FIG. 8 is a process flow diagram illustrating an example method 800 for generating a DCI message according to various embodiments. With reference to FIGS. 1-8, the method 800 may be performed by a processor of a base station (e.g., the base station 110a-110d, 350), one specific example of which may be a gNB of a 5GNR RAN. In various embodiments, the operations of method 800 may be performed in conjunction with the operations of methods 400 (FIG. 4) and/or 500 (FIG. 5). As one specific example, the operations of method 800 may be performed as part of the operations of block 404 of method 400 (FIG. 4) to generate a DCI message that may be a DCI format 1_0 message with the CRC scrambled by P-RNTI.

In response to generating a Paging Message as described with reference to block 402 of method 400 (FIG. 4), in block 802 the processor of the base station may determine respective UE_IDs of the set of one or more wireless devices.

In block 804, the processor of the base station may determine one or more ranges of UE_ID values corresponding to the respective UE_IDs of the set of one or more wireless devices. Ranges of UE_ID values may define groupings of possible UE_ID values, for example, UE_ID values 0 to 169, UE_ID values 170 to 339, UE_ID values 340 to 509, UE_ID values 510 to 679, UE_ID values 680 to 849, and UE_ID values 850 to 1023. The processor of the base station may select the one or more UE_ID ranges into which the UE_IDs of the set of one or more wireless devices fall.

In block 806, the processor of the base station may set the value of the last six reserved bits of a DCI format 1_0 message with the CRC scrambled by P-RNTI to indicate the one or more ranges of UE_ID values. Ranges of UE_ID values may be associated with LSB bit determinations for the six reserved bits in the DCI format 1_0 message with the CRC scrambled by P-RNTI. For example, LSB bit 1 (000001) may be associated with UE_ID values 0 to 169, LSB bit 2 (000010) may be associated with UE_ID values 170 to 339, LSB bit 3 (0000100) may be associated with UE_ID values 340 to 509, LSB bit 4 (001000) may be associated with UE_ID values 510 to 679, LSB bit 5 (010000) may be associated with UE_ID values 680 to 849, and LSB bit 6 (100000) may be associated with UE_ID values 850 to 1023.

In response to setting the value of the last six reserved bits in block 806, the processor of the base station may proceed to block 406 of method 400 (FIG. 4) to send the DCI message over a PDCCH.

Figure 9:
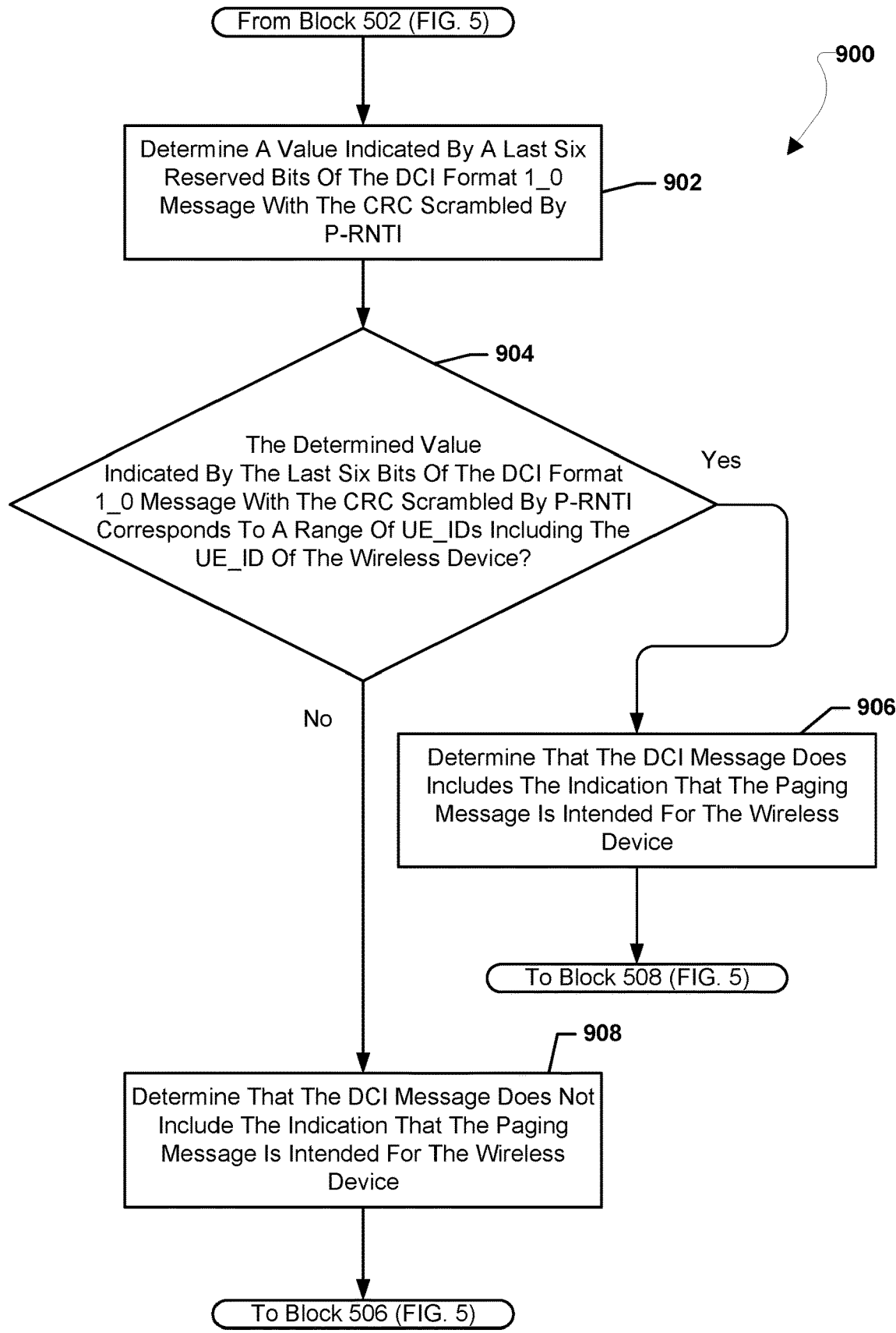
FIG. 9 is a process flow diagram illustrating a method performed by a processor of a wireless device for determining whether a DCI message including an indication that a Paging Message is intended for the wireless device in accordance with various embodiments.

FIG. 9 is a process flow diagram illustrating an example method 900 for determining whether a DCI message including an indication that a Paging Message is intended for the wireless device according to various embodiments. With reference to FIGS. 1-9, the method 900 may be performed by a processor of a wireless device (e.g., the wireless device 120a-120e, 200, 320). As a specific example, the operations of method 900 may be performed by a wireless device operating in a DRX cycle as scheduled by a base station (e.g., the base station 110a-110d, 350), such as a gNB of a 5GNR RAN. In various embodiments, the operations of method 900 may be performed in conjunction with the operations of methods 400 (FIG. 4), 500 (FIG. 5), and/or 800 (FIG. 8). As specific examples, the operations of method 700 may be performed as part of the operations of determination block 504 of method 500 (FIG. 5) to determine whether a DCI message including an indication that a Paging Message is intended for the wireless device and the DCI message that may be a DCI format 1_0 message with the CRC scrambled by P-RNTI.

In response to receiving a DCI message as described with reference to block 502 of method 500 (FIG. 5), in bock 902 the processor of the wireless device may determine a value indicated by a last six reserved bits of the DCI format 1_0 message with the CRC scrambled by P-RNTI. For example, the wireless device processor may parse the DCI message to identify a value indicated by a last six reserved bits of the DCI format 1_0 message with the CRC scrambled by P-RNTI.

In determination block 904, the processor of the wireless device may determine whether the determined value indicated by the last six reserved bits of the DCI format 1_0 message with the CRC scrambled by P-RNTI corresponds to a range of user equipment (UE) identifiers (UE_IDs) including the UE_ID of the wireless device. Ranges of UE_ID values may be associated with LSB bit determinations for the six reserved bits in the DCI format 1_0 message with the CRC scrambled by P-RNTI. For example, LSB bit 1 (000001) may be associated with UE_ID values 0 to 169, LSB bit 2 (000010) may be associated with UE_ID values 170 to 339, LSB bit 3 (0000100) may be associated with UE_ID values 340 to 509, LSB bit 4 (001000) may be associated with UE_ID values 510 to 679, LSB bit 5 (010000) may be associated with UE_ID values 680 to 849, and LSB bit 6 (100000) may be associated with UE_ID values 850 to 1023. The wireless device may compare the value of the LSBs of the six reserved bits in the decoded DCI format 1_0 message with the CRC scrambled by P-RNTI to the mapping between LSB bit values and UE_IDs to determine the UE_ID ranges to which the Paging Message is intended. The wireless device may determine whether its UE_ID falls in any of the UE_ID ranges to which the Paging Message is intended.

In response to determining that the determined value indicated by the last six reserved bits of the DCI format 1_0 message with the CRC scrambled by P-RNTI corresponds to the range of user UE_IDs including the UE_ID of the wireless device (i.e., determination block 904="Yes"), the processor of the wireless device may determine that the DCI messages does include the indication that the Paging Message is intended for the wireless device in block 906.

In response to determining that the DCI messages does include the indication that the Paging Message is intended for the wireless device, the processor of the base station may proceed to block 508 of method 500 (FIG. 5) and decode the PDSCH.

In response to determining that the determined value indicated by the last six reserved bits of the DCI format 1_0 message with the CRC scrambled by P-RNTI does not correspond to the range of user UE_IDs including the UE_ID of the wireless device (i.e., determination block 904="No"), the processor of the wireless device may determine that the DCI messages does not include the indication that the Paging Message is intended for the wireless device in block 908.

In response to determining that the DCI messages does not include the indication that the Paging Message is intended for the wireless device, the processor of the base station may proceed to block 506 of method 500 (FIG. 5) and skip the decoding of the PDSCH.

Figure 10:
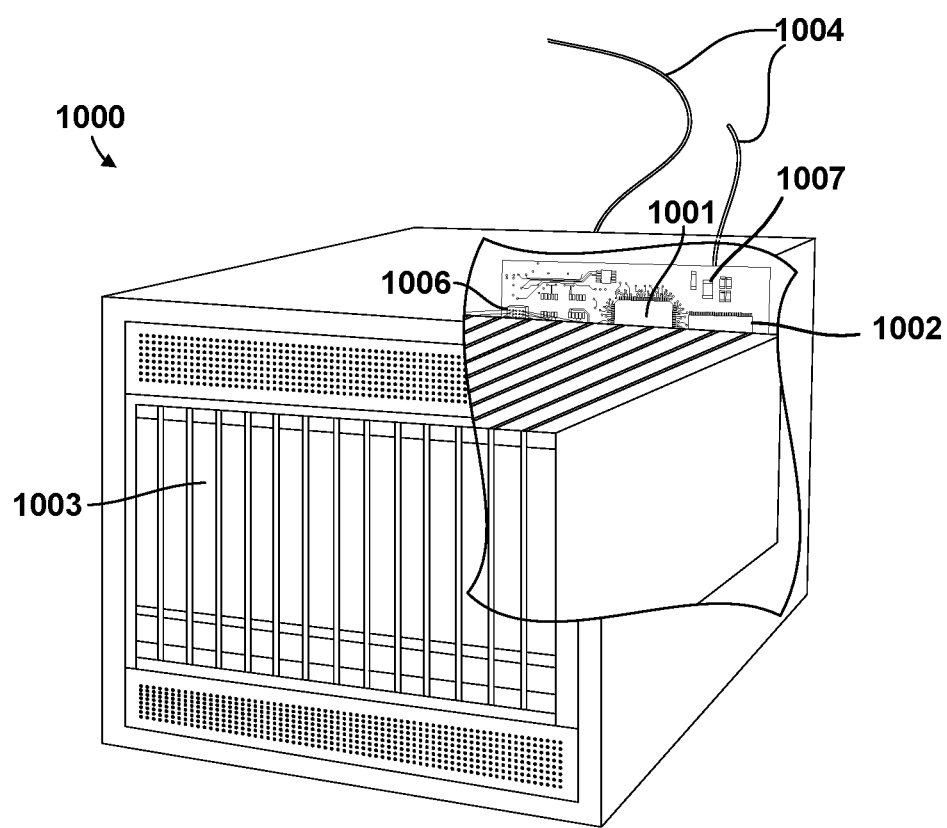
FIG. 10 is a component block diagram of a network computing device suitable for use with various embodiments.

Various embodiments may be implemented on a variety of wireless network devices, an example of which is illustrated in FIG. 10 in the form of a wireless network computing device 1000 functioning as a network element of a communication network, such as a base station (e.g., base station 110a-110d, 350, etc.). Such network computing devices may include at least the components illustrated in FIG. 10. With reference to FIGS. 1-10, the network computing device 1000 may typically include a processor 1001 coupled to volatile memory 1002 and a large capacity nonvolatile memory, such as a disk drive 1003. The network computing device 1000 may also include a peripheral memory access device, such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional access ports, such as USB, Firewire, Thunderbolt, and the like for coupling to peripherals, external memory, or other devices.

Figure 11:
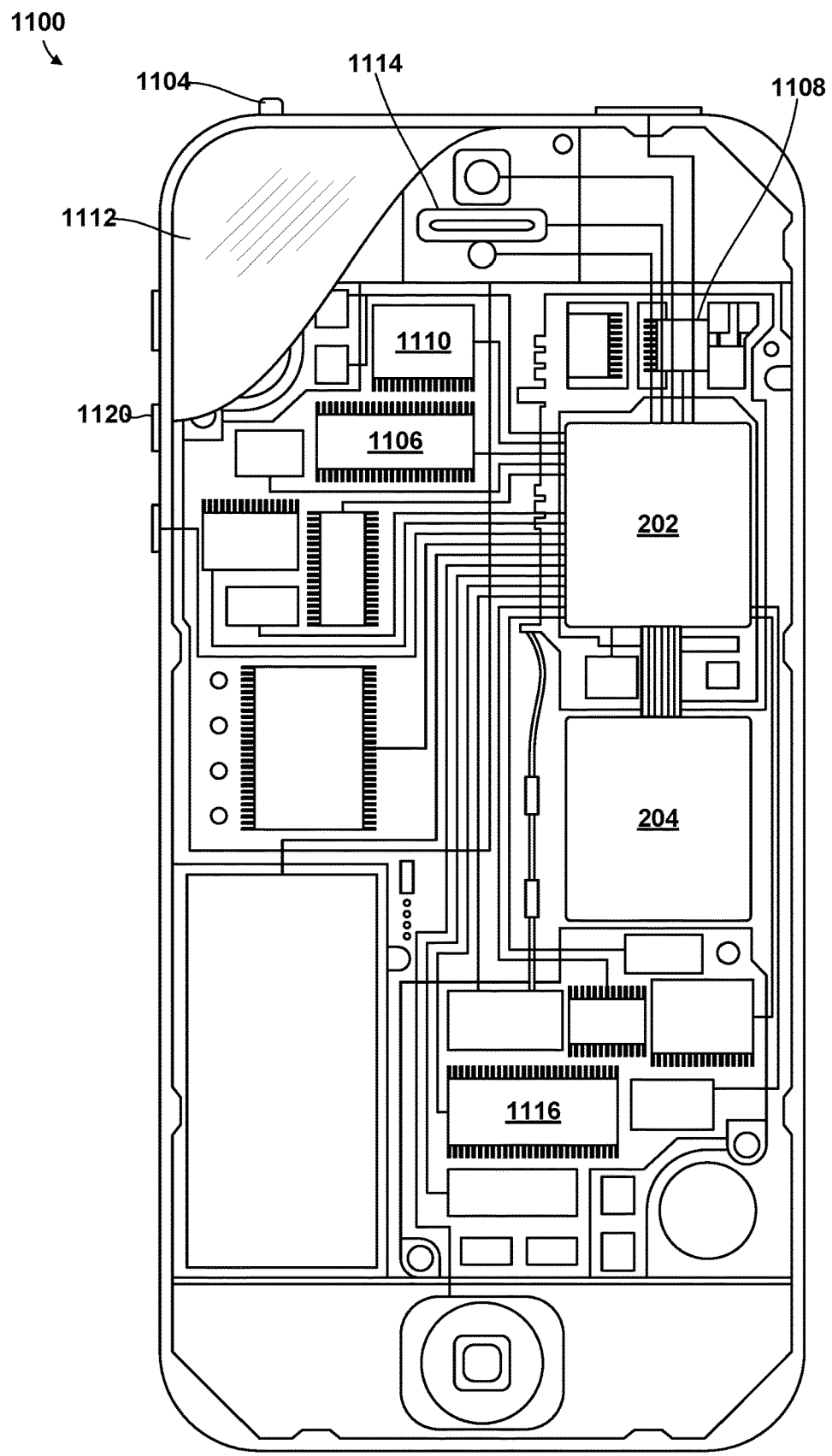
FIG. 11 is a component block diagram of a wireless device suitable for use with various embodiments.

Various embodiments may be implemented on a variety of wireless devices (e.g., the wireless device 120a-120e, 200, 320), an example of which is illustrated in FIG. 11 in the form of a smartphone 1100. With reference to FIGS. 1-11, the smartphone 1100 may include a first SOC 202 (e.g., a SOC-CPU) coupled to a second SOC 204 (e.g., a 5G capable SOC). The first and second SOCs 202, 204 may be coupled to internal memory 1106, 1116, a display 1112, and to a speaker 1114. Additionally, the smartphone 1100 may include an antenna 1104 for sending and receiving electromagnetic radiation that may be connected to a wireless data link and/or cellular telephone transceiver 1108 coupled to one or more processors in the first and/or second SOCs 202, 204. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1108 and CODEC circuit 1110 may include a digital signal processor (DSP) circuit (not shown separately).

The processors of the wireless network computing device 1000 and the smart phone 1100 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1106, 1116 before they are accessed and loaded into the processor. The processors may include internal memory sufficient to store the application software instructions As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, 700, 800, and/or 900 may be substituted for or combined with one or more operations of the methods 400, 500, 600, 700, 800, and/or 900.

Implementation examples of wireless device embodiments are described in the following paragraphs. While some of the following implementation examples are described in terms of example methods, further example implementations may include: the example methods discussed in the following paragraphs implemented by a wireless device including an apparatus with a processing system configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method performed by a processor of a wireless device for supporting wireless device paging in a network, including: decoding a downlink control information (DCI) message received from a base station of the network on a Physical Downlink Control Channel (PDCCH); determining whether the DCI message includes an indication that a Paging Message is intended for the wireless device; and skipping decoding of a Physical Downlink Shared Channel (PDSCH) in a current paging discontinuous reception (DRX) cycle in response to determining that the DCI message does not include the indication that the Paging Message is intended for the wireless device.

Example 2. The method of example 1, further including: decoding the Physical Downlink Shared Channel (PDSCH) in the current paging DRX cycle in response to determining that the DCI message includes the indication that the Paging Message is intended for the wireless device.

Example 3. The method of example 2, in which the DCI message is a DCI format 1_0 message with a cyclic redundancy check (CRC) scrambled by a Paging-Radio Network Temporary Identifier (RNTI) (P-RNTI).

Example 4. The method of example 3, in which: the wireless device is operating in a Radio Resource Control (RRC)_IDLE mode; and determining whether the DCI message includes the indication that the Paging Message is intended for the wireless device includes determining whether a bit value setting in a Short Message field of the DCI format 1_0 message with the CRC scrambled by P-RNTI equals a value associated with a Paging Message being intended only for wireless devices operating in the RRC_INACTIVE mode.

Example 5. The method of example 4, further including: determining that the DCI messages does not include the indication that the Paging Message is intended for the wireless device in response to determining that the bit value setting in the Short Message field of the DCI format 1_0 message with the CRC scrambled by P-RNTI is equal to the value associated with the Paging Message being intended only for wireless devices operating in the RRC_INACTIVE mode.

Example 6. The method of any of examples 3-4, further including: determining that the DCI messages includes the indication that the Paging Message is intended for the wireless device in response to determining that the bit value setting in the Short Message field of the DCI format 1_0 message with the CRC scrambled by P-RNTI is not equal to the value associated with the Paging Message being intended only for wireless devices operating in the RRC_INACTIVE mode.

Example 7. The method of example 3, in which determining whether the DCI message includes the indication that the Paging Message is intended for the wireless device includes: determining a value indicated by a last six reserved bits of the DCI format 1_0 message with the CRC scrambled by P-RNTI.

Example 8. The method of example 7, further including: determining whether the determined value indicated by the last six reserved bits of the DCI format 1_0 message with the CRC scrambled by P-RNTI corresponds to a range of user equipment (UE) identifiers (UE_IDs) including the UE_ID of the wireless device.

Example 9. The method of example 8, further including: determining that the DCI messages includes the indication that the Paging Message is intended for the wireless device in response to determining that the determined value indicated by the last six reserved bits of the DCI format 1_0 message with the CRC scrambled by P-RNTI corresponds to the range of user UE_IDs including the UE_ID of the wireless device.

Example 10. The method of any of examples 8-9, further including: determining that the DCI messages does not include the indication that the Paging Message is intended for the wireless device in response to determining that the determined value indicated by the last six reserved bits of the DCI format 1_0 message with the CRC scrambled by P-RNTI does not correspond to the range of user UE_IDs including the UE_ID of the wireless device.

Example 11. The method of any of examples 1-10, in which the network is a Fifth Generation (5G) New Radio (NR) (5GNR) network.

Implementation examples of base station embodiments are described in the following paragraphs. While some of the following implementation examples are described in terms of example methods, further example implementations may include: the example methods discussed in the following paragraphs implemented by a base station including an apparatus with a processing system configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 12. A method performed by a processor of a base station for supporting wireless device paging in a network, including: generating a downlink control information (DCI) message including an indication that a Paging Message is intended for a set of wireless devices; and sending the DCI message over a Physical Downlink Control Channel (PDCCH).

Example 13. The method of example 12, in which the DCI message is a DCI format 1_0 message with a cyclic redundancy check (CRC) scrambled by a Paging-Radio Network Temporary Identifier (RNTI) (P-RNTI).

Example 14. The method of example 13, in which: the set of wireless devices is a set of only wireless devices operating in a Radio Resource Control (RRC)_INACTIVE mode; and the indication that the Paging Message is intended for the set of wireless devices is a bit setting in a Short Message field of the DCI format 1_0 message with the CRC scrambled by P-RNTI that indicates a Paging Message is intended only for wireless devices operating in the RRC_INACTIVE mode.

Example 15. The method of example 13, in which: the set of wireless devices is one or more wireless devices, each of the one or more wireless devices associated with its own respective user equipment (UE) identifier (UE_ID); and the indication that the Paging Message is intended for the set of wireless devices is a value indicated by a last six reserved bits of the DCI format 1_0 message with the CRC scrambled by P-RNTI that indicates one or more ranges of UE_ID values corresponding to the respective UE_IDs of the one or more wireless devices.

Example 16. The method of any of examples 12-15, in which the network is a Fifth Generation (5G) New Radio (NR) (5GNR) network.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for supporting wireless device paging in a network, comprising:
    decoding a downlink control information (DCI) message with a cyclic redundancy check (CRC) scrambled by a Paging-Radio Network Temporary Identifier (P-RNTI);
    determining in a Radio Resource Control (RRC) IDLE mode whether the DCI message includes an indication that a paging message is intended for the wireless device resulting in a first determination that the DCI message includes the indication or a second determination that the DCI message does not include the indication, wherein the indication is based on a bit value in a short message field of the DCI message being equal to a value associated with the paging message being intended only for wireless devices operating in a RRC_INACTIVE mode; and
    skipping decoding of a Physical Downlink Shared Channel (PDSCH) in a current paging discontinuous reception (DRX) cycle based on the second determination.

2. The method of claim 1, further comprising:
    decoding the Physical Downlink Shared Channel (PDSCH) in the current paging DRX cycle based on the first determination.

3. The method of claim 2, wherein the DCI message is a DCI format 1_0 message.

4. The method of claim 1, further comprising determining that the DCI message does not include the indication based on the bit value being equal to the value associated with the paging message being intended only for wireless devices operating in the RRC_INACTIVE mode.

5. The method of claim 4, further comprising determining that the DCI message includes the indication based on the bit value being not equal to the value associated with the paging message being intended only for wireless devices operating in the RRC_INACTIVE mode.

6. The method of claim 1, wherein the network is a Fifth Generation (5G) New Radio (NR) (5GNR) network.

7. A method performed by a processor of a base station for supporting wireless device paging in a network, comprising:
    generating a downlink control information (DCI) message with a cyclic redundancy check (CRC) scrambled by a Paging-Radio Network Temporary Identifier (P-RNTI) that includes an indication that a paging message is intended for a wireless devices, wherein the indication is based on a bit value in a short message field of the DCI message being equal to a value associated with the paging message being intended only for wireless devices operating in a RRC_INACTIVE mode; and
    sending the DCI message over a Physical Downlink Control Channel (PDCCH).

8. The method of claim 7, wherein the DCI message is a DCI format 1_0 message.

9. The method of claim 7, wherein the network is a Fifth Generation (5G) New Radio (NR) (5GNR) network.

10. A wireless device, comprising:
    a memory; and
    a processor coupled to the memory, wherein the wireless device is configured to:
        decode a downlink control information (DCI) message with a cyclic redundancy check (CRC) scrambled by a Paging-Radio Network Temporary Identifier (P-RNTI);
        determine in a Radio Resource Control (RRC) IDLE mode whether the DCI message includes an indication that a paging message is intended for the wireless device, resulting in a first determination that the DCI message includes the indication or a second determination that the DCI message does not include the indication, wherein the indication is based on a bit value in a short message field of the DCI message being equal to a value associated with the paging message being intended only for wireless devices operating in a RRC_INACTIVE mode; and
        skip decoding of a Physical Downlink Shared Channel (PDSCH) in a current paging discontinuous reception (DRX) cycle based on the second determination.

11. The wireless device of claim 10, wherein the wireless device is configured to decode the Physical Downlink Shared Channel (PDSCH) in the current paging DRX cycle based on the first determination.

12. The wireless device of claim 11, wherein the DCI message is a DCI format 1_0 message.

13. The wireless device of claim 10, wherein the wireless device is configured to determine that the DCI message does not include the indication based on the bit value being equal to the value associated with the paging message being intended only for wireless devices operating in the RRC_INACTIVE mode.

14. The wireless device of claim 13, wherein the wireless device is configured to determine that the DCI message includes the indication based on the bit value being not equal to the value associated with the paging message being intended only for wireless devices operating in the RRC_INACTIVE mode.

15. A base station of a network, comprising:
a memory; and
a processor coupled to the memory, wherein the base station is configured to:
generate a downlink control information (DCI) message with a cyclic redundancy check (CRC) scrambled by a Paging-Radio Network Temporary Identifier (P-RNTI) that includes an indication that a paging message is intended for a set of wireless devices, wherein the indication is based on a bit value in a short message field of the DCI message being equal to a value associated with the paging message being intended only for wireless devices operating in a RRC_INACTIVE mode; and
send the DCI message over a Physical Downlink Control Channel (PDCCH).

16. The base station of claim 15, wherein the DCI message is a DCI format 1_0 message.

* * * * *